(12) United States Patent
Hwang

(10) Patent No.: US 8,737,916 B2
(45) Date of Patent: May 27, 2014

(54) METADATA DISPLAY CONTROL METHOD AND SYSTEM FOR BROADCAST RECEIVER

(75) Inventor: Sun Ho Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 474 days.

(21) Appl. No.: 12/176,568

(22) Filed: Jul. 21, 2008

(65) Prior Publication Data

US 2010/0013997 A1    Jan. 21, 2010

(51) Int. Cl.
*H04B 5/00* (2006.01)
*H04B 7/00* (2006.01)

(52) U.S. Cl.
USPC ...... 455/41.2; 455/41.3; 455/556.1; 348/553; 348/563; 348/564

(58) Field of Classification Search
USPC ......... 455/41.2, 41.3, 556; 348/553, 563, 564
See application file for complete search history.

(56) References Cited

U.S. PATENT DOCUMENTS

| | | | | |
|---|---|---|---|---|
| 6,407,779 B1 * | 6/2002 | Herz | | 348/734 |
| 6,496,122 B2 * | 12/2002 | Sampsell | | 340/825.69 |
| 2002/0029387 A1 * | 3/2002 | Nishikawa | | 725/61 |
| 2002/0056112 A1 * | 5/2002 | Dureau et al. | | 725/78 |
| 2002/0184626 A1 * | 12/2002 | Darbee et al. | | 725/39 |
| 2004/0168187 A1 * | 8/2004 | Chang | | 725/40 |
| 2005/0076393 A1 * | 4/2005 | Sussman | | 725/137 |
| 2005/0091698 A1 * | 4/2005 | Shikata | | 725/132 |
| 2005/0240631 A1 * | 10/2005 | Willard et al. | | 707/200 |
| 2006/0028582 A1 * | 2/2006 | Zahn | | 348/552 |
| 2006/0161949 A1 * | 7/2006 | Tsukamoto | | 725/39 |
| 2007/0044096 A1 * | 2/2007 | Choe | | 717/178 |
| 2008/0052626 A1 * | 2/2008 | Han | | 715/721 |
| 2008/0140305 A1 * | 6/2008 | Kim et al. | | 701/117 |
| 2009/0216745 A1 * | 8/2009 | Allard | | 707/5 |

* cited by examiner

*Primary Examiner* — Wen Huang
(74) *Attorney, Agent, or Firm* — H.C. Park & Associates, PLC

(57) ABSTRACT

A metadata display control method and system for a digital broadcast receiver for displaying metadata associated with a broadcast program on a secondary display terminal while displaying the broadcast program on a primary display terminal is provided. The metadata display control method includes receiving a broadcast program and metadata of the broadcast program at a primary display terminal from a first broadcast channel, transmitting the metadata to a secondary display terminal while displaying the broadcast program, and displaying the metadata received from the primary display terminal at the secondary display terminal.

20 Claims, 6 Drawing Sheets

METADATA DISPLAY CONTROL METHOD AND SYSTEM FOR BROADCAST RECEIVER

BACKGROUND OF THE INVENTION

1. Field of the Invention

The present invention relates to a digital broadcast system and, in particular, to a metadata display control method and system for a digital broadcast receiver that may display metadata associated with a broadcast program on a secondary display terminal while displaying the broadcast program on a primary display terminal.

2. Discussion of the Background

With the advance of technologies and the demand variations of subscribers, broadcast service environments are changing and becoming more complicated. Analog broadcast services are evolving into digital broadcast services, and broadcasting media are diversified with terrestrial, cable, and satellite broadcast systems. Recently, interactive broadcast services have begun to operate with communication networks, and broadcast receivers are becoming more advanced.

Interactive broadcast services include Smart TV, Enhanced TV, Intelligent TV, and Internet TV. The concept of interactive television (TV) covers a wide range of services and systems. An interactive TV may allow a viewer to control the time and program to watch and provides various additional functions such as Internet access, data broadcast, and Personal Video Recorder (PVR) functions. Particularly, an interactive TV may allow the viewer to provide some personal input or feedback to a broadcast station. The broadcast station transmits metadata associated with broadcast programs through an additional forward channel and receives viewer feedback through a return channel. For example, the metadata of a sports program may include profiles of players, scores of the teams, and a tournament profile. Also, the metadata of a drama may include information about backgrounds of scenes, characters, synopsis, and producers and staffs. Also, the metadata may include an Electronic Program Guide (EPG) of a corresponding service channel.

Typically, the metadata is displayed on a part of a display screen so as to partially conceal the broadcast program image displayed on the display screen, which may inconvenience the viewer. The conventional interactive TV may provide an option to disable the metadata presentation. In this case, however, the viewer may have to manipulate a menu in order to check the metadata, which may cause additional inconvenience. Furthermore, when there are several viewers and one wants to view the metadata, he/she may be required to obtain consent from all of the other viewers.

SUMMARY OF THE INVENTION

The present invention provides a metadata display control method and system for a broadcast receiver that may display the metadata of a broadcast program on a secondary display terminal while displaying the broadcast program on a primary display terminal.

Additional features of the invention will be set forth in the description which follows, and in part will be apparent from the description, or may be learned by practice of the invention.

The present invention discloses a metadata display control method for a broadcast receiver including receiving a broadcast program and metadata of the broadcast program at a primary display terminal from a first broadcast channel, transmitting the metadata to a secondary display terminal while displaying the broadcast program, and displaying the metadata received from the primary display terminal at the secondary display terminal.

The present invention also discloses a metadata display control system for a broadcast receiver including a primary display terminal and a secondary display terminal. The primary display terminal, which includes a first short range wireless communication module and a return channel to a broadcast program provider, receives a broadcast program and metadata of the broadcast program. The secondary display terminal, which includes a second short range wireless communication module, receives the metadata through a radio link established between the first and second short range wireless communication modules and displays the metadata.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
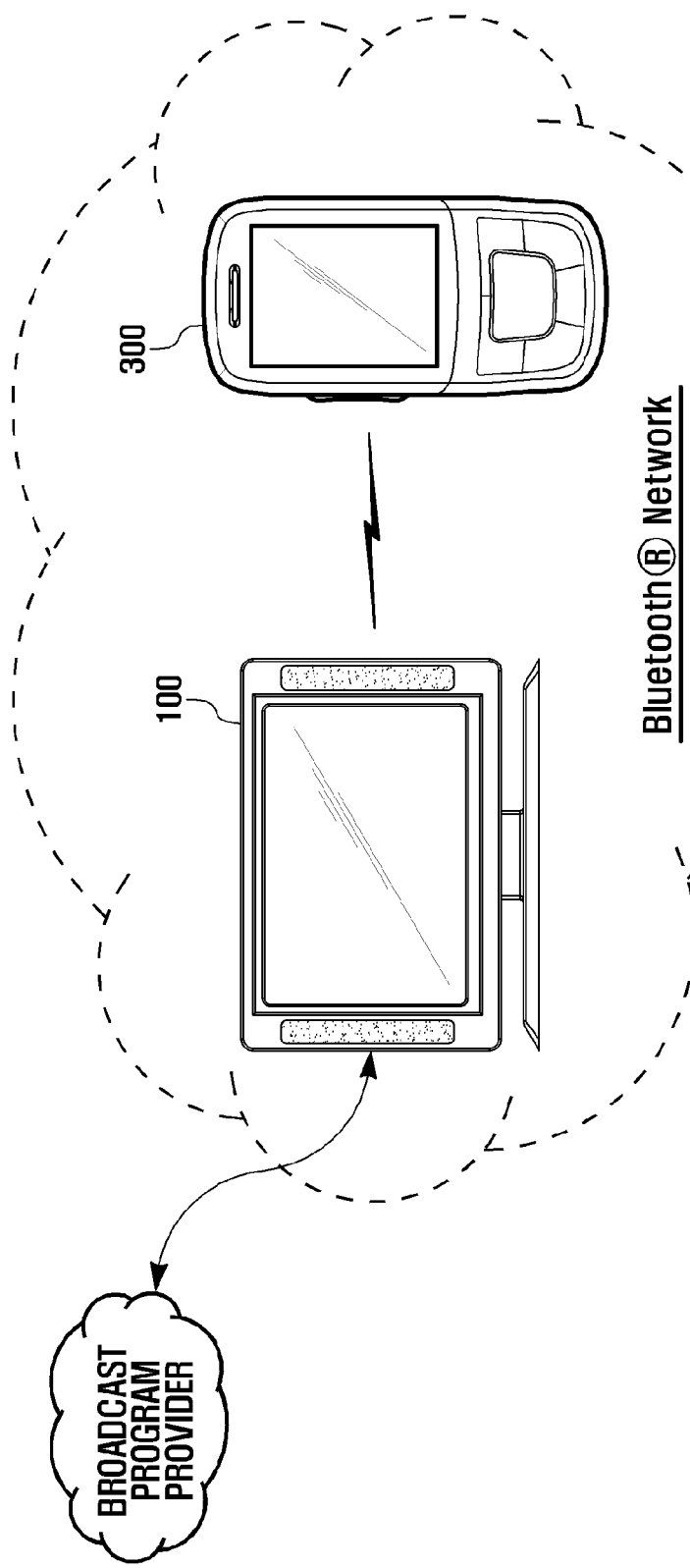
FIG. 1 is a schematic diagram showing a metadata display control system according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

The terms and phrases used in the specification and appended claims are provided to enable a clear and consistent understanding of the detailed description and the claims. Unless otherwise noted, the terms and phrases are to be understood according to conventional usage by those skilled in the relevant art. While the invention is shown and described with reference to certain exemplary embodiments thereof, it will be understood by those skilled in the art that various changes in form and details may be made therein without departing from the spirit and scope of the invention as defined by the appended claims.

In the following, the metadata display control method and system is described in association with an interactive TV as the primary display terminal and a mobile terminal as the secondary display terminal. However, the present invention is not limited thereto. For example, the metadata display control method and system of exemplary embodiments of the present invention may be applied to various digital broadcast-enabled devices, such as dedicated digital broadcast receivers, mobile terminals, palmtop and laptop computers, and their equivalent devices.

Also, the mobile terminal as the secondary display terminal may be any portable device equipped with a short range wireless communication module, such as a Personal Digital Assistant (PDA), a Smartphone, a Code Division Multiple Access (CDMA) terminal, a Global System for Mobile communications (GSM) terminal, an International Mobile Telecommunication 2000 (IMT-2000) terminals including Wideband CDMA (WCDMA) terminal and CDMA2000 terminal, portable computers, and their equivalent devices.

In the following, the primary and secondary display terminals are connected to each other through Bluetooth® as the short range wireless communication technology. However, the present invention is not limited thereto. For example, the short range wireless communication technology to establish a wireless connection between the primary and secondary display terminals can be any of ZigBee®, RuBee® (IEEE 1902.1), Ultra Wideband (UWB), and Infrared Data Association (IrDA) or any other technology that enables short range wireless connection.

In order to enable a clear and consistent understanding of the detailed description and the claims, supplementary information and services such as an Electronic Program Guide (EPG), an Electronic Service Guide (ESG), program-specific information (backgrounds of scenes, characters, a billing system of TV shopping, a response to quiz, etc.) produced in association with broadcast programs and accessed by viewers in real time are referred to as "metadata" hereinafter. The metadata may be received separate from the original broadcast program and stored separately when the metadata is not transmitted in real time. The metadata may include a plurality of metadata items that can be selectively presented in response to a viewer's command. The metadata of a specific broadcast program may include detailed information on the broadcast program. For example, if the viewer selects a metadata or a sub-metadata associated with a broadcast program, a page linked to the metadata or sub-metadata is presented. The page may contain detailed information related to the program and attributes of the program. In order for the viewer to transmit feedback to the broadcast station or broadcast program provider, a return channel is provided.

Figure 2:
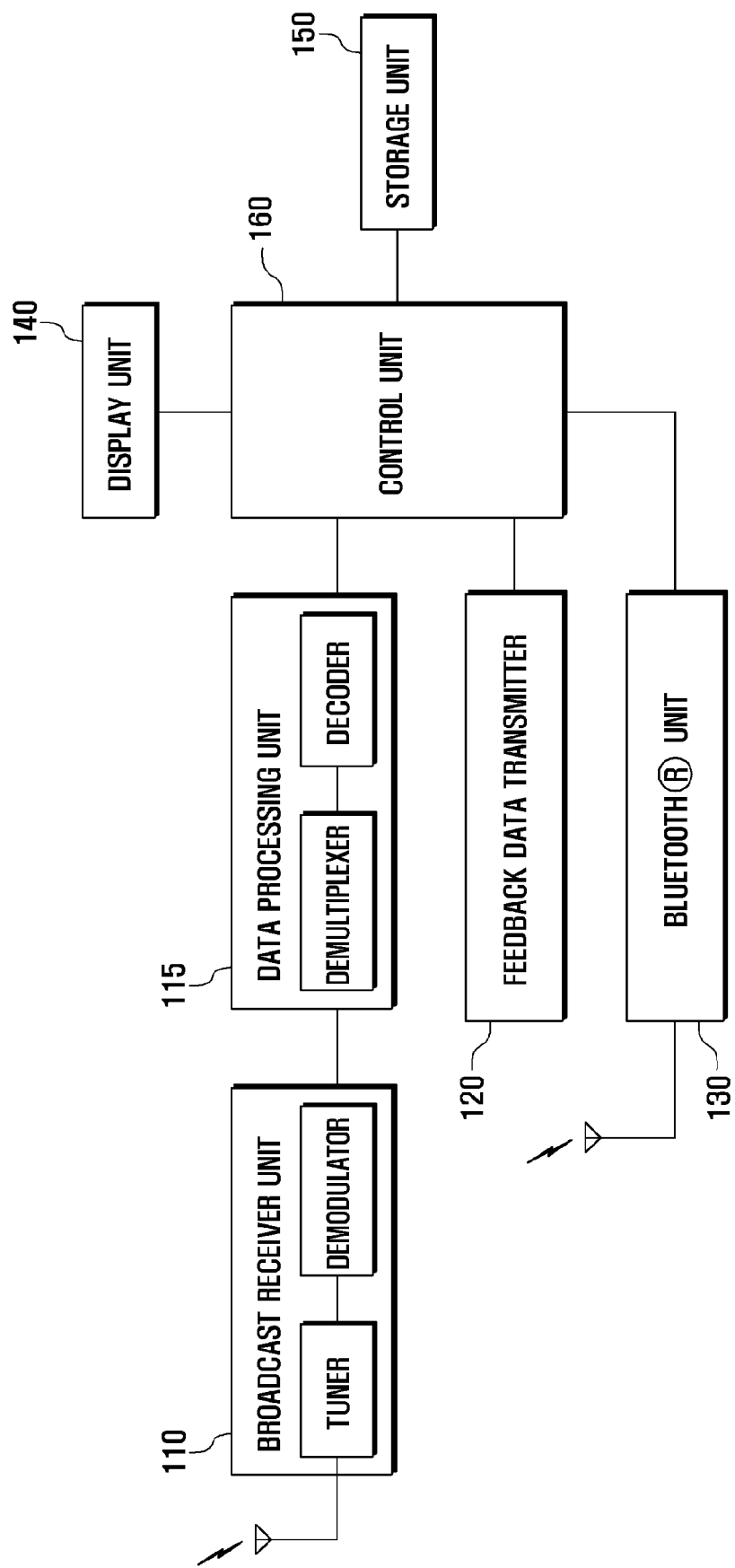
FIG. 2 is a block diagram showing a configuration of an interactive TV of the metadata display control system of FIG. 1.

FIG. 1 is a schematic diagram showing a metadata display control system according to an exemplary embodiment of the present invention, and FIG. 2 is a block diagram showing a configuration of an interactive TV 100 of the metadata display control system of FIG. 1.

Referring to FIG. 2, the interactive TV 100 of a metadata display control system includes a broadcast receiver unit 110, a data processing unit 115, a feedback data transmitter 120, a Bluetooth® unit 130, a display unit 140, a storage unit 150, and a control unit 160.

The broadcast receiver unit 110 includes a tuner and a demodulator. The tuner is tuned to a frequency channel by the control unit 160 in response to a channel selection command input by a viewer to receive a broadcast signal. The demodulator demodulates the broadcast signal received through the frequency channel and outputs demodulated broadcast data.

The data processing unit 115 includes a demultiplexer and a decoder to process the broadcast data. The demultiplexer demultiplexes the broadcast data into audio and video data. The decoder decodes the audio and video data, such that the audio data is output through a speaker (not shown) in the form of an audible sound wave and the video data is output through the display unit 140 in the form of a visual image.

The feedback data transmitter 120 receives return channel data from the control unit 160 and modulates the return channel data in a predetermined modulation scheme. When the return channel to transmit feedback information to the broadcast program provider is established through an Internet Protocol (IP) network, the feedback data transmitter 120 further includes a modem to process the feedback data.

The Bluetooth® unit 130 is provided with a Bluetooth® antenna to establish a Bluetooth® channel with another Bluetooth® device (in this exemplary embodiment, a mobile terminal 300). The Bluetooth® unit 130 may include a host stack required for Bluetooth® communication and Bluetooth® profiles and application programs that can be selected depending on the functions and capability of the mobile terminal 300. Particularly in this exemplary embodiment, the interactive TV 100 is configured to transmit the metadata and sub-metadata, i.e. detailed information linked to the metadata, to the mobile terminal 300 through the Bluetooth® unit 130. The interactive TV 100 is also configured to receive a control signal (such as a channel selection signal, a power control signal, or a metadata selection signal) through the Bluetooth® module 130.

The display unit 140 displays the video data of the broadcast program transmitted by the broadcast station. The display unit 140 also presents menus of the interactive TV 100 and information input by the viewer. The display unit 140 may include a Liquid Crystal Display (LCD). When the display unit 140 is an LCD that supports touchscreen functionality, it may be used as an input unit. Particularly in this exemplary embodiment, the display unit 140 may be set to display only the broadcast program and not the metadata.

The storage unit 150 stores an application program to execute functions of the interactive TV 100 and broadcast programs recorded according to the viewer's intention. When a function of the interactive TV 100 is activated in response to the viewer's command, the corresponding application program is executed under the control of the control unit 160. The storage unit 150 also stores the metadata, sub-metadata linked to the metadata, and user data input by the viewer.

The control unit 160 controls general operation of the interactive TV 100 and signaling among the internal units. Particularly in the exemplary embodiment, the control unit 160 controls the interactive TV 100 such that the metadata received in association with the broadcast programs provided by the broadcast station or broadcast program provider is transmitted to the mobile terminal 300. In more detail, the Bluetooth® unit 130 establishes a communication link with the mobile terminal 300 under the control of the control unit 160, and then the control unit 160 controls the interactive TV 100 on the basis of the control command received from the mobile terminal 300 through the Bluetooth® link. For example, if the viewer inputs a power-on command using the mobile terminal 300, the mobile terminal 300 generates and transmits a power-on command signal to the interactive TV 100 such that the control unit 160 of the interactive TV 100 controls the interactive TV 100 to power on and begin receiving the broadcast signal through the service channel selected before the power-off of the interactive TV 100. That is, the control unit 160 controls the tuner of the broadcast receiver unit 110 to be tuned to the frequency channel set at the power-off of the interactive TV 100. If no communication link is established between the interactive TV 100 and the mobile terminal 300, the control unit 160 of the interactive TV 100 may request communication channel establishment with the mobile terminal 300. If the viewer requests to switch the channel, the control unit 160 controls the tuner to be tuned to the frequency corresponding to the channel requested by the viewer. The control unit 160 of the interactive TV 100 recognizes the control signals received through the Bluetooth® unit 130 as remote control signals.

The interactive TV 100 receives the broadcast programs and metadata associated with the broadcast programs and sends the metadata to the mobile terminal 300 through the Bluetooth® unit 130 under the control of the control unit 160. This is done when the interactive TV 100 is set to operate in a remote control mode. When the interactive TV 100 operates in the remote control mode, the metadata is transmitted to the mobile terminal 300 through a Bluetooth® link established between the interactive TV 100 and the mobile terminal 300. In this case the control unit 160 of the interactive TV 100 encodes the metadata in a coding scheme of the mobile terminal 300 and transmits the coded metadata to the mobile terminal 300 through the Bluetooth® link. When the Bluetooth® mode is disabled, the metadata overlaps the broadcast program displayed on the screen of the interactive TV 100.

Figure 3:
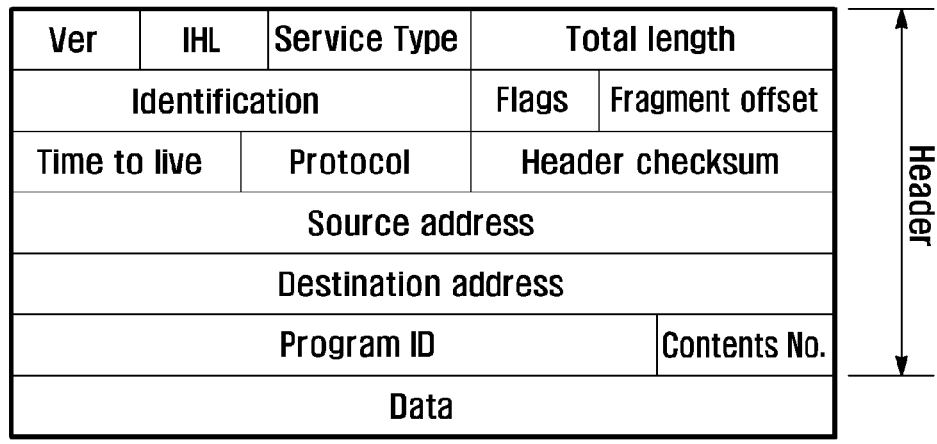
FIG. 3 is a diagram showing a data format of a feedback packet for use in the metadata display control system of FIG. 1.

If a feedback signal generated by selecting information linked to the metadata is received from the mobile terminal 300, the control unit 160 of the interactive TV 100 transmits the feedback signal to the broadcast program provider. At this time, the control unit 160 of the interactive TV 100 decodes the selection information and re-encodes the selection information into the feedback signal in an appropriate format to be transmitted to the broadcast program provider. FIG. 3 shows an exemplary data format of a feedback packet to be transmitted to the broadcast program provider. The feedback packet includes a header and data field. The header includes a source address field indicating the address of the interactive TV 100 and a destination address field indicating the address of the broadcast program provider. The program ID is a unique identifier to identify the broadcast program associated with the metadata selected by the viewer. The Contents No. indicates an index number of a selected metadata item. The data field contains the feedback data, e.g. a detailed information query or a product purchase request.

That is, if the viewer selects one of items constituting the metadata associated with a broadcast program, the control unit 160 generates a feedback packet containing the Program ID and the Contents No. indicating the selected metadata item. The feedback packet is transmitted to the broadcast program provider through the feedback data transmitter 120.

Upon receiving a sub-metadata queried by the feedback packet, the control unit 160 transmits the sub-metadata to the mobile terminal 300. According to the viewer's setting, the metadata and sub-metadata may be displayed on at least one of the display unit 140 of the interactive TV 100 and the mobile terminal 300.

Although not depicted in FIG. 2, the interactive TV 100 may further include other internal components such as an input/output unit and an additional digital broadcast receiver unit. Also, the interactive TV 100 may include a wireless local area network module or a wireless metropolitan area network module. In this case, the interactive TV 100 may be configured to download the metadata and sub-metadata from a web server through a wireless Internet connection.

Figure 4:
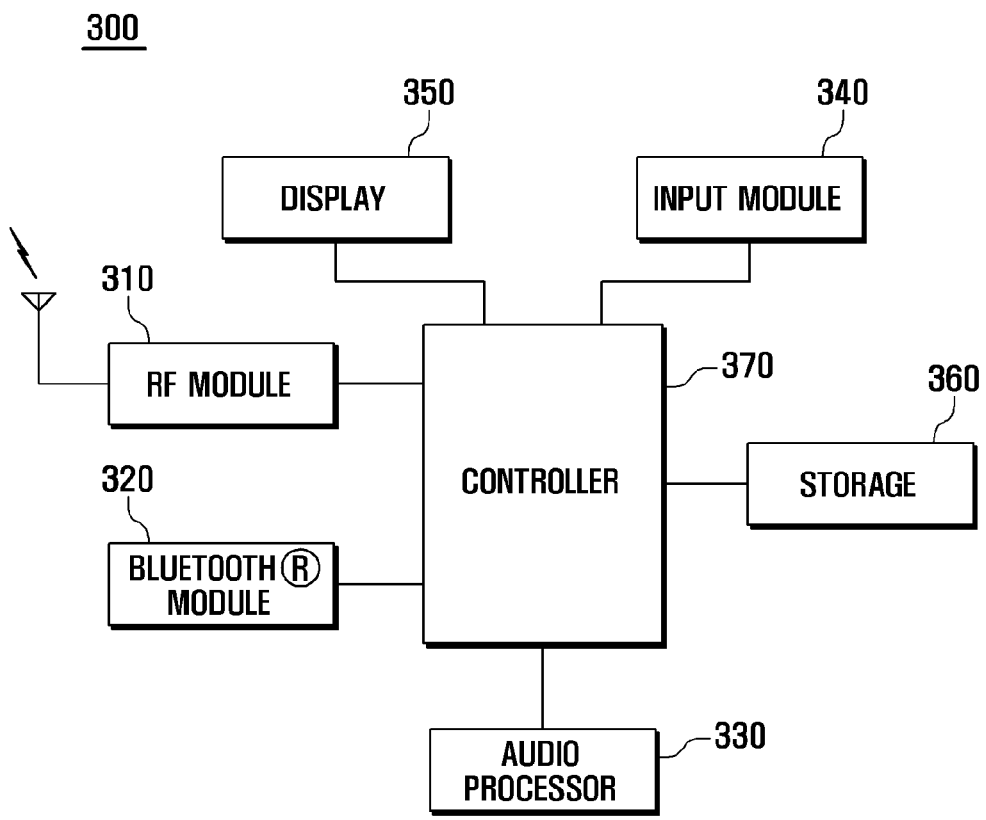
FIG. 4 is a block diagram showing a configuration of the mobile terminal of FIG.

FIG. 4 is a block diagram showing a configuration of the mobile terminal of FIG. 1.

Referring to FIG. 4, the mobile terminal 300 includes a radio frequency (RF) module 310, a Bluetooth® module 320, an audio processor 330, an input module 340, a display 350, a storage 360, and a controller 370.

The RF module 310 establishes a radio channel with a base station such that the mobile terminal 300 performs voice and data communication with another mobile terminal and accesses a web server to transmit control messages and download contents including metadata associated with the broadcast program. The RF module 310 includes an RF transmitter to up-convert and amplify a signal to be transmitted and an RF receiver to low noise amplify and down-convert a signal received through an antenna. If the metadata of the broadcast programs is provided by a web server, the mobile terminal 300 may directly download the metadata from the web server through the communication link established through the RF unit 310.

The Bluetooth® module 320 is provided with a Bluetooth® antenna to establish a Bluetooth® link with other Bluetooth®-enabled devices (in this exemplary embodiment, the interactive TV 100). The Bluetooth® module 320 is configured to establish a Bluetooth Link® with the Bluetooth® unit 130 of the interactive TV 100 such that the mobile terminal 300 and the interactive TV 100 may perform Bluetooth® communication. The Bluetooth® module 320 may be provided with a Bluetooth® host stack and supports various Bluetooth® profiles and application programs that can be selectively executed depending on the functions and capability of the interactive TV 100. Particularly in this exemplary embodiment, the Bluetooth® module 320 is configured to establish a communication link and transmit control signals and feedback information to the interactive TV 100 through the communication link and receive the metadata and sub-metadata from the interactive TV 100.

The audio processor 330 processes the audio data output by the controller 370 so as to output the audio data in the form of an audible sound wave through a speaker and processes the audio signal input though a microphone so as to output the processed audio signal to the controller 370.

The input module 340 is provided with a plurality of alphanumeric keys for inputting alphanumeric data and a plurality of function keys for configuring and executing various functions of the mobile terminal 300. The function keys may be independent navigation keys, side keys, or shortcut keys. The input module 340 generates command signals corresponding to the keys and transmits the command signals to the controller 370. Particularly in this exemplary embodiment, the input module 340 is configured to generate a selection signal in response to user input selecting a metadata item associated with a broadcast program.

The display 350 displays various menus, alphanumeric data input by the user, and the operation status of the mobile terminal 300. The display 350 may be an LCD. When the display 350 is an LCD having touchscreen functionality, it may be used as a part of the input module 340. Particularly in this exemplary embodiment, the display 350 displays the metadata and sub-metadata received from the interactive TV 100.

The storage 360 stores application programs associated with the functions of the mobile terminal 300, metadata and sub-metadata downloaded from the interactive TV 100 or the web server, and user data. The storage 360 may be provided with a buffer to temporarily save the user data while executing an application program such as a short messaging service program. The storage 360 may be divided into a program region and a data region. The program region may store the application program to present the metadata and transmit selection information informing the interactive TV 100 of a metadata item selected while the metadata is displayed. The data region may store the metadata and sub-metadata received from the interactive TV 100.

The controller 370 controls general operations of the mobile terminal 300 and signaling among the internal components of the mobile terminal 300. The controller 370 may include a data processor to process the audio data output by the audio processor 330, alphanumeric data input by the viewer, and communication data input by the RF module 310. In this case, the data processor may include a transmitter to encode and modulate the transmission signal to be transmitted through the RF module 310 and a receiver to demodulate and decode the reception signal received through the RF module 310. The data processor is composed of a modem and a codec.

Particularly in this exemplary embodiment, the controller 370 controls the Bluetooth® module 320 to establish a communication link between the mobile terminal 300 and the interactive TV 100. In more detail, when the viewer sets the mobile terminal 300 to operate in a remote control mode, the controller 370 activates the Bluetooth® module 320 so as to establish a Bluetooth® link with the interactive TV 100. If a power control command is input by the viewer after the establishment of the Bluetooth® link, the controller 370 transmits the power control signal to the interactive TV 100. The controller 370 also receives the metadata transmitted by the interactive TV through the Bluetooth® link and displays the metadata on the display 350. If the viewer selects one of items constituting the metadata, the controller 370 transmits information of the selected item to the interactive TV 100. The controller 370 can control the interactive TV 100 such that the metadata is displayed even when the service channel is switched or the broadcast program ends. For example, the controller 370 may be configured to present a query message asking the viewer whether to maintain the display of the metadata in the form of a popup window.

Although not depicted in FIG. 4, the mobile terminal 300 may further include other functional modules such as camera module and wireless local area network module.

The operations of the above structured metadata display control method is described hereinafter with reference to FIG. 5.

Figure 5:
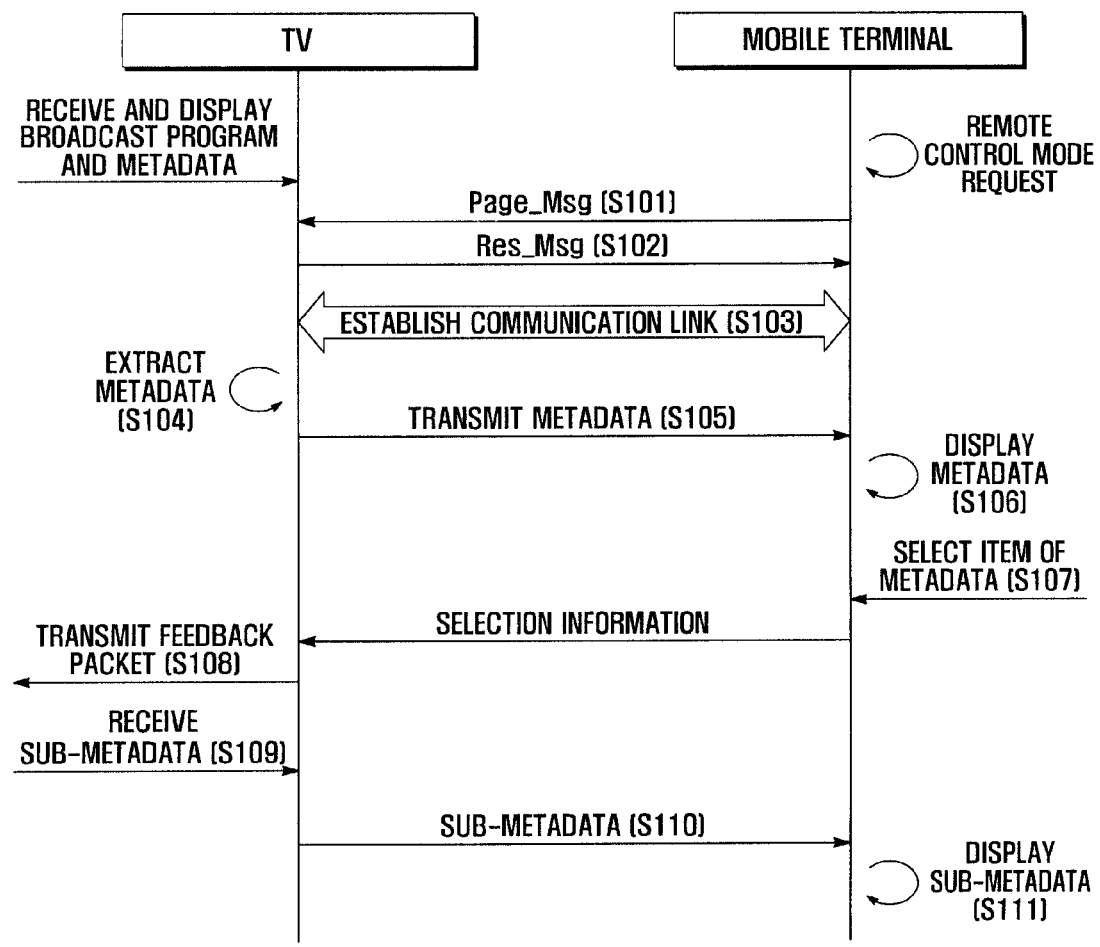
FIG. 5 is a message flow diagram showing a metadata display control method according to an exemplary embodiment of the present invention.

FIG. 5 is a message flow diagram showing a metadata display control method according to an exemplary embodiment of the present invention.

Referring to FIG. 5, if a user sets the mobile terminal 300 to operate in a remote control mode, the mobile terminal 300 activates its Bluetooth® module and broadcasts a paging message (Page_Msg) (S101). Bluetooth®-enabled devices located in the Bluetooth® radio coverage of the mobile terminal 300 can transmit the Page_Msg. In this exemplary embodiment, the interactive TV 100 is registered with the mobile terminal 300 and receives the Page_Msg while playing a broadcast program received together with metadata associated with the broadcast program. If the interactive TV 100 is not registered with the mobile terminal 300, the mobile terminal 300 transmits an inquiry message (Inquiry_Msg) and the interactive TV 100 sends a response message in response to the Inquiry_Msg to register with the mobile terminal 300.

Upon receipt of the Page_Msg, the interactive TV 100 transmits a response message (Res_Msg) to the mobile terminal 300 (S102). Consequently, a Bluetooth® link is established between the interactive TV 100 and the mobile terminal 300 (S103). At this time, the interactive TV 100 may be playing the broadcast program received from a broadcast station. Even when the interactive TV 100 is in the power-off state, the Bluetooth® unit 130 is in an active state to receive the Page_Msg transmitted by the mobile terminal 300. If the Page_Msg is received in the power-off state, the Bluetooth® unit 130 of the interactive TV 100 responds to the Page_Msg to establish the Bluetooth® link such that the mobile terminal 100 transmits a power-on command to the interactive TV 100 through the Bluetooth® link. The interactive TV 100 powers on in response to the power-on command so as to receive and play the broadcast program and metadata.

Although the metadata is received with the broadcast program simultaneously in this exemplary embodiment, the metadata may be received through a separate channel. That is, the interactive TV 100 may be configured to display a query message asking whether to receive the metadata in the form of a popup window. For example, when the interactive TV 100 powers on and the viewer selects a channel, the interactive TV 100 presents the query message asking whether to receive the metadata associated with the broadcast program on the display unit 140. The metadata may be received whenever the user requests, and the query message is not displayed when the corresponding option is disabled by the user.

If the metadata is received from the broadcast program provider (S104), the interactive TV 100 transmits the metadata to the mobile terminal 300 through the Bluetooth® link (S105). The metadata display control method may further include displaying a query message asking whether the viewer to check the metadata associated with the ongoing broadcast program.

Figure 7:
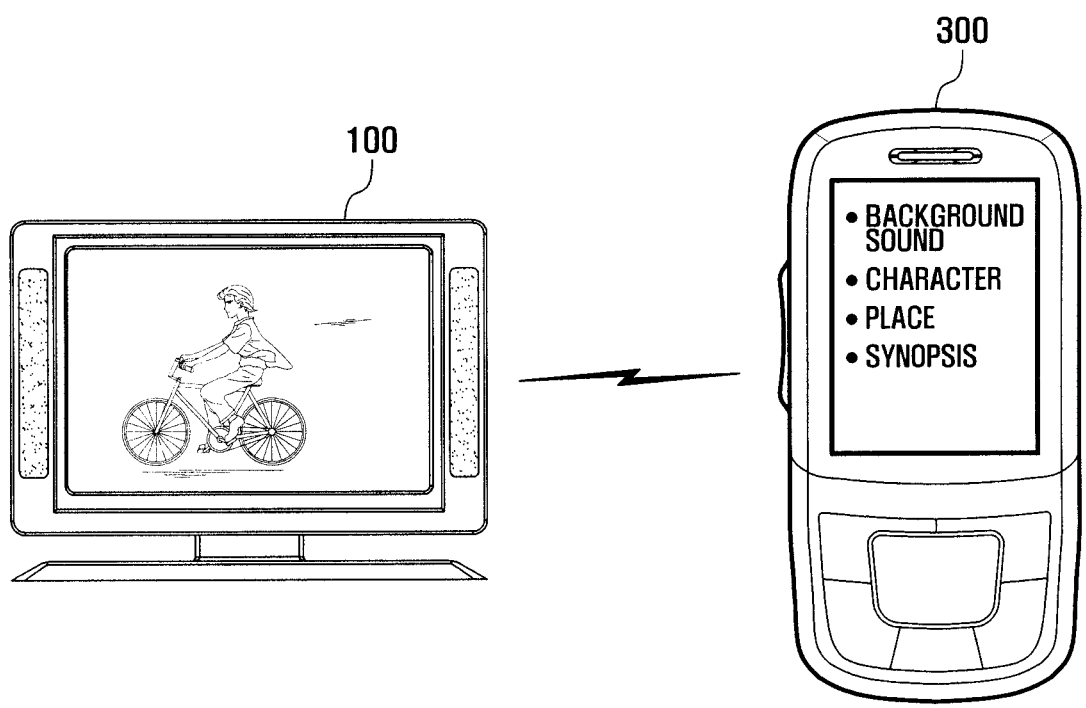
FIG. 7 is diagram showing how a broadcast program and metadata are displayed according to an exemplary embodiment of the present invention.

Upon receipt of the metadata, the mobile terminal 300 displays the metadata on its display (S106). For example, if the broadcast program is a drama, the metadata may contain information associated with the drama as shown in FIG. 7. The metadata of the drama may include the information such as background music, characters, background scenes, and a synopsis.

If one of items constituting the metadata is selected while the metadata is displayed (S107), the mobile terminal 300 transmits selection information indicating the selected item to the interactive TV 100. The selection information includes a contents number indicating the selected item, the corresponding program ID, and the user request (e.g., detailed information request).

If the selection information is received, the interactive TV 100 generates a feedback packet containing the selection information and transmits the feedback packet to the broadcast program provider (S108). In response to the feedback packet, the interactive TV 300 receives sub-metadata corresponding to the item selected by the viewer (S109). Upon receipt of the sub-metadata, the interactive TV 100 delivers the sub-metadata to the mobile terminal 300 through the Bluetooth® link (S110). Consequently, the mobile terminal 300 displays the sub-metadata on its display (S111).

In this exemplary embodiment, the mobile terminal 300 and the interactive TV 100 are set to operate in the remote control mode, the interactive TV 100 transmits the metadata received from the broadcast program provider to the mobile terminal 300 such that the mobile terminal 300 displays the metadata on its display, thereby effectively presenting the metadata without interfering with the display of the original broadcast program.

Also, the viewer may control the interactive TV 100 to display the metadata anytime and request detailed information about a specific item of the metadata. Furthermore, since the mobile terminal 300 can communicate with the interactive TV 100, the viewer may request and receive the metadata on the move. For example, the viewer may request metadata from the interactive TV 100 at a position A and then receive the metadata transmitted by the interactive TV 100 at a position B.

Figure 6:
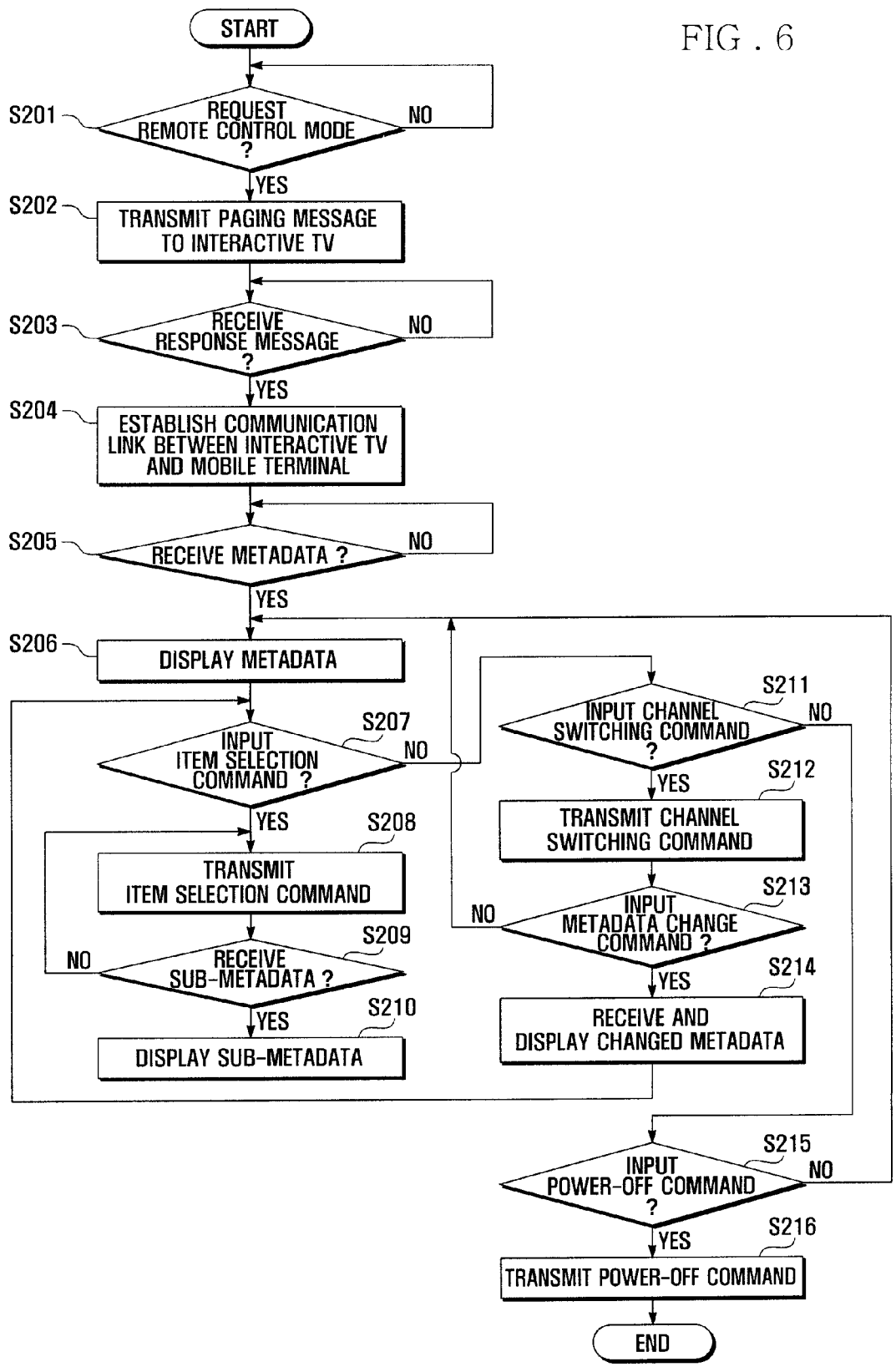
FIG. 6 is a flowchart showing a metadata display control method according to an exemplary embodiment of the present invention.

FIG. 6 is a flowchart showing a metadata display control method according to an exemplary embodiment of the present invention. Since the communication link establishment procedure of steps S201 to S204 are identical to steps S101 to S103 of FIG. 5, detailed descriptions of steps S201 to S204 are omitted.

After the communication link is established through steps S201 to S204, the controller 370 of the mobile terminal 300 determines whether the metadata associated with an ongoing broadcast program is received (S205). If the metadata is received, the controller 370 detects the receipt of the metadata and displays the received metadata on the display 350 (S206).

While displaying the metadata, the controller 370 monitors to detect a user command input by the viewer and determines, if a user command is detected, whether the user command is an item selection command indicating the selection of an item of the metadata (S207). If it is determined that the user command is an item selection command, the controller 370 transmits the item selection command to the interactive TV 100 (S208) and determines whether a sub-metadata corresponding to the selected item is received (S209). If sub-metadata is received from the interactive TV 100, the controller 370 displays the sub-metadata on the display 350 (S210). If sub-metadata is not received from the interactive TV 100, the controller 370 again transmits the item selection command to the interactive TV 100 (S208).

If it is determined that the user command is not an item selection command, the controller 370 determines whether the user command is a channel switching command (S211). If the user command is a channel switching command, the controller 370 transmits the channel switching command to the interactive TV 100 (S212) and determines whether a metadata change command is input by the viewer (S213). If a metadata change command is detected, the control unit 370 receives the metadata of a broadcast program of the new broadcast channel from the interactive TV 100 and displays the metadata on the display 350 (S214). At this time, the controller 370 may display a query message, in the form of a popup window, asking for a selection of a channel number of which metadata is displayed. If a metadata update command is not detected, the controller 370 continues to display the metadata of the broadcast program viewed before switching the channel.

If it is determined that the user command is not a channel switching command at step S211, the controller 370 determines whether the user command is a power-off command (S215). If the user command is a power-off command, the controller 370 transmits the power-off command to the interactive TV 100 (S216).

As described above, the metadata display control method and system of the present invention may allow a primary display terminal to receive a broadcast program and metadata associated with the broadcast program and transmit the metadata to a secondary display terminal such that the secondary display terminal displays the metadata while the primary display terminal displays the broadcast program, which may effectively provide the metadata to a user without interfering with the presentation of the original broadcast program.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A metadata display control method for a broadcast receiver, comprising:
   receiving a broadcast program and metadata of the broadcast program at a primary display terminal from a first broadcast channel;
   transmitting the metadata to a secondary display terminal while displaying the broadcast program;
   displaying a plurality of items constituting the metadata received from the primary display terminal at the secondary display terminal;
   transmitting selection information encoded based on a first format to the primary display terminal via a radio link established between the primary display terminal and the secondary display terminal in response to selection of one of the plurality of items;
   decoding and re-encoding the selection information based on a second format;
   transmitting the re-encoded selection information from the primary display terminal to a broadcast station, the re-encoded selection information comprising an identification of the broadcast program, indexing information of the selected item, and request information for sub-metadata of the selected item;
   receiving the sub-metadata from the broadcast station at the primary display terminal in response to transmitting the re-encoded selection information to the broadcast station;
   transmitting the sub-metadata from the primary display terminal to the secondary display terminal; and
   displaying the sub-metadata at the secondary display terminal,
   wherein the metadata comprises broadcast program-specific information and program guide information.

2. The metadata display control method of claim 1, further comprising:
   transmitting a channel switching request from the secondary display terminal to the primary display terminal, the channel switching request being a request to switch to a second broadcast channel; and
   displaying a broadcast program received on the second broadcast channel at the primary display terminal.

3. The metadata display control method of claim 2, further comprising:
   transmitting a metadata of the broadcast program of the second broadcast channel from the primary display terminal to the secondary display terminal in response to a request from the secondary display terminal; and
   displaying the metadata of the broadcast program of the second broadcast channel at the secondary display terminal.

4. The metadata display control method of claim 3, wherein the metadata further comprises supplementary service information, and the program guide information is associated with the broadcast channels.

5. The metadata display control method of claim 4, wherein the radio link between the primary display terminal and the secondary display terminal is established using one of Bluetooth®, ZigBee®, Ultra Wideband (UWB), RuBee®, and Infrared Data Association (IrDA).

6. The metadata display control method of claim 1, wherein the metadata further comprises supplementary service information.

7. The metadata display control method of claim 1, wherein the primary display terminal is configured to transmit the selection information to the broadcast station through a return channel.

8. The metadata display control method of claim 1, further comprising:
receiving a command at the secondary terminal before receiving a broadcast program, the command determining whether to receive the metadata of the broadcast program.

9. The metadata display control method of claim 1, wherein:
the identification of the broadcast program and the indexing information of the selected item are re-encoding as header information for a packetized transmission; and
the request information for the sub-metadata of the selected item is re-encoded as payload information for the packetized transmission.

10. A metadata display control system for a broadcast receiver, comprising:
a primary display terminal comprising a first short range wireless communication module and a return channel to a broadcast station, the primary display terminal configured to receive, through another channel, a broadcast program and metadata of the broadcast program; and
a secondary display terminal comprising a second short range wireless communication module, the secondary display terminal configured to receive the metadata through a radio link established between the first short range wireless communication module and the second short range wireless communication module and further configured to display a plurality of items constituting the metadata,
wherein the secondary display terminal is further configured to transmit selection information of a selected item of the metadata to the primary display terminal through the radio link in response to selection of one of the plurality of items, the selection information being encoded according to a first format,
wherein the primary display terminal is further configured to:
decode and re-encode the selection information based on a second format;
transmit the re-encoded selection information to the broadcast station through the return channel, the re-encoded selection information comprising an identification of the broadcast program, indexing information of the selected item, and request information for sub-metadata of the selected item; and
transmit the sub-metadata corresponding to the re-encoded selection information to the secondary display terminal, and
wherein the metadata comprises broadcast program-specific information and program guide information.

11. The metadata display control system of claim 10, wherein the secondary display terminal is further configured to transmit a power control signal and a channel switching signal to the primary display terminal through the radio link.

12. The metadata display control system of claim 11, wherein the primary display terminal is further configured to switch to a second broadcast channel when a channel switching signal is received, to display a broadcast program on the second broadcast channel, and to transmit metadata of the broadcast program of the second broadcast channel to the secondary display terminal.

13. The metadata display control system of claim 12, wherein the secondary display terminal is further configured to determine whether to display the metadata of the first broadcast channel or the metadata of the second broadcast channel.

14. The metadata display control system of claim 13, wherein the first short range wireless communication module and the second short range wireless communication module are each one of a Bluetooth® module, a ZigBee® module, an Ultra Wideband (UWB) module, a RuBee® module, and an Infrared Data Association (IrDA) module.

15. The metadata control system of claim 10, wherein:
the identification of the broadcast program and the indexing information of the selected item are re-encoding as header information for a packetized transmission; and
the request information for the sub-metadata of the selected item is re-encoded as payload information for the packetized transmission.

16. A method, comprising:
receiving, via a first channel, broadcast programing and metadata associated with the broadcast programing, the metadata comprising broadcast program-specific information and program guide information;
displaying the broadcast programming;
transmitting the metadata to a secondary display device for display, the metadata corresponding to a plurality of selectable items;
receiving selection information encoded according to a first format via a radio link with the secondary display device, the selection information being associated with selection of one of the selectable items;
decoding and re-encoding the selection information according to a second format;
transmitting, via a second channel, the re-encoded selection information to a broadcast station, the re-encoded selection information comprising an identification of the broadcast program, indexing information of the selected item, and request information for sub-metadata of the selected item;
receiving, in response to transmitting the re-encoded selection information, the sub-metadata; and
transmitting the sub-metadata to the secondary display device for display.

17. A method according to claim 16, further comprising:
determining whether to transmit the metadata to the secondary display device for display based on user profile information or a query response.

18. The method of claim 16, wherein:
the identification of the broadcast program and the indexing information of the selected item are re-encoding as header information for a packetized transmission; and
the request information for the sub-metadata of the selected item is re-encoded as payload information for the packetized transmission.

19. A method, comprising:
  receiving metadata from a primary display device, the metadata being associated with broadcast programming being displayed by the primary display device;
  displaying a plurality of selectable items constituting the metadata;
  receiving selection of one of the plurality of selectable items;
  generating selection information associated with the selection, the selection information comprising an indexing number associated with the one selectable item, an identifier associated with the broadcast programing, and request information associated with sub-metadata;
  transmitting, via a radio link, the selection information to the primary display device for transmission to a broadcaster of the broadcast programming;
  receiving the sub-metadata associated with the selection information from the primary display device; and
  displaying the sub-metadata,
  wherein an encoding of the selection information to the primary display device is different than an encoding of the selection information to the broadcaster.

20. The method of claim 19, wherein the encoding of the selection information to the broadcaster comprises:
  the identification of the broadcast program and the indexing information of the selected item encoded as header information for a packetized transmission; and
  the request information for the sub-metadata of the selected item encoded as payload information for the packetized transmission.

* * * * *